United States Patent
Tada et al.

(10) Patent No.: US 9,108,284 B2
(45) Date of Patent: Aug. 18, 2015

(54) DUST COLLECTION DEVICE FOR POWER TOOL AND POWER TOOL

(75) Inventors: Yoshiro Tada, Anjo (JP); Kiyonobu Yoshikane, Anjo (JP); Yoshitaka Machida, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 566 days.

(21) Appl. No.: 13/421,528

(22) Filed: Mar. 15, 2012

(65) Prior Publication Data

US 2012/0273243 A1  Nov. 1, 2012

(30) Foreign Application Priority Data

Apr. 26, 2011 (JP) .................................. 2011-098599
Oct. 27, 2011 (JP) .................................. 2011-236352

(51) Int. Cl.
*B25D 17/14* (2006.01)
*B23Q 11/00* (2006.01)

(52) U.S. Cl.
CPC ........ *B23Q 11/0046* (2013.01); *B23Q 11/0071* (2013.01)

(58) Field of Classification Search
CPC .. B23Q 1/0009; B23Q 11/0046; E21B 21/16; B25D 17/14
USPC ........ 173/75, 109, 171, 198, 201; 408/67, 56, 408/61, 58; 175/209
See application file for complete search history.

(56) References Cited

U.S. PATENT DOCUMENTS

| | | | |
|---|---|---|---|
| 5,349,752 A * | 9/1994 | Stirm | 30/124 |
| 5,467,835 A * | 11/1995 | Obermeier et al. | 175/209 |
| 7,017,680 B2 * | 3/2006 | Arich et al. | 173/198 |
| 2002/0141836 A1 * | 10/2002 | Ege et al. | 408/67 |
| 2004/0208715 A1 * | 10/2004 | Arich | 408/67 |
| 2005/0281627 A1 * | 12/2005 | Britz | 408/67 |
| 2007/0251199 A1 * | 11/2007 | Valentini | 55/385.1 |
| 2008/0202781 A1 * | 8/2008 | Nishikawa et al. | 173/104 |
| 2009/0148248 A1 * | 6/2009 | Nishikawa et al. | 408/67 |

FOREIGN PATENT DOCUMENTS

| | | |
|---|---|---|
| DE | 43 35 417 A1 | 4/1995 |
| EP | 1 245 330 A2 | 10/2002 |
| EP | 1 872 899 A1 | 1/2008 |
| EP | 1 964 649 A2 | 9/2008 |
| JP | 2005-335060 A | 12/2005 |
| JP | 2010-201525 A | 9/2010 |

OTHER PUBLICATIONS

Sep. 11, 2012 Extended European Search Report issued in Application No. 12160391.4.
Jan. 6, 2015 Office Action issued in Japanese Patent Application No. 2011-236352.

* cited by examiner

*Primary Examiner* — Nathaniel Chukwurah
(74) *Attorney, Agent, or Firm* — Oliff PLC

(57) ABSTRACT

In a dust collection device attached to a hammer drill, a filter is provided in a dust box at a position at which the filter covers an outlet provided on a rear face of a lid body, in a state such that a filter surface projects into the dust box from the rear face of the lid body. A space is formed between an inner face of a box main body and a side face of the filter that is adjacent to the filter surface. Air outlets are provided to guide air, which flows in through an inlet, toward the space.

14 Claims, 13 Drawing Sheets

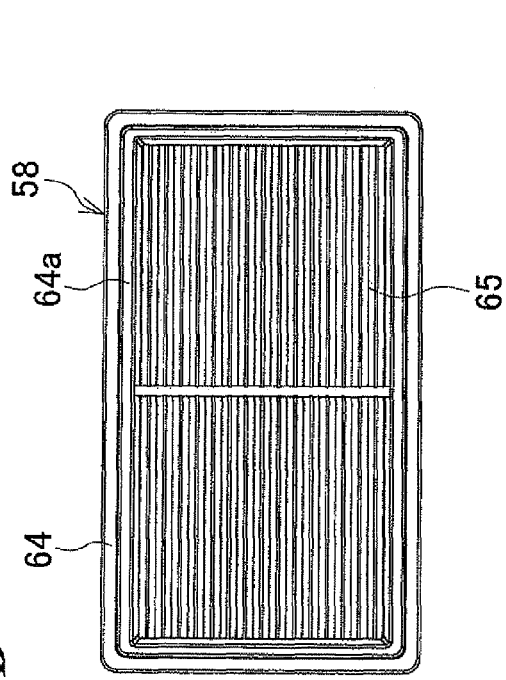
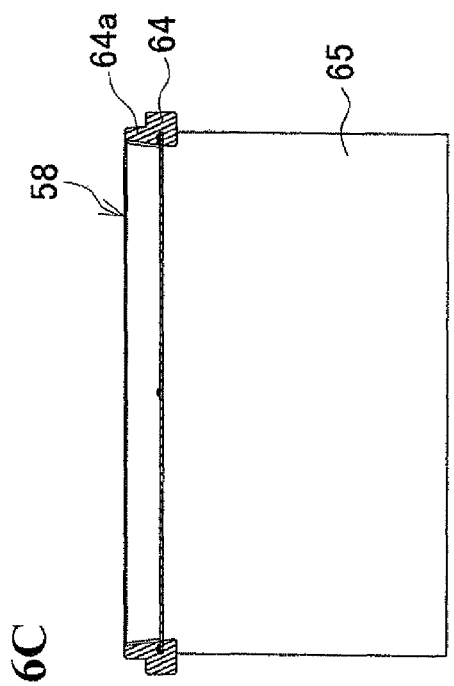
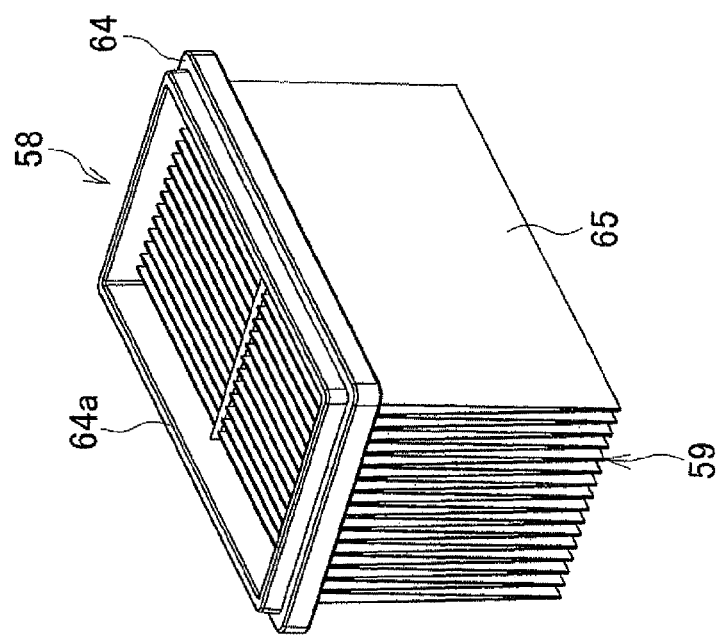

DUST COLLECTION DEVICE FOR POWER TOOL AND POWER TOOL

BACKGROUND OF INVENTION

This application claims the entire benefit of Japanese Patent Application Number 2011-098599 filed on Apr. 26, 2011 and Japanese Patent Application Number 2011-236352 filed on Oct. 27, 2011, the entirety of which is incorporated by reference.

TECHNICAL FIELD

The present invention relates to a dust collection device for a power tool to be attached to a power tool such as an electric drill or a hammer drill, and to a power tool to which the dust collection device is attached.

BACKGROUND ART

Dust collection devices that collect and recover dust arising from a workpiece, for example, during boring, are attached to power tools such as electric drills or hammer drills. Examples of such dust collection devices for power tools include the device described in publication of Japanese Patent No. 3448110. In the device, a hose connected to an adapter, through which the tool tip runs through, is connected to a housing that is joined to a power tool, and a separator (dust box) is detachably accommodated in the housing. The separator is provided with a first opening section upstream and a second opening section downstream in the airflow direction, such that a folded-type filter that partitions the first and second openings from each other is disposed in the interior of the housing. Therefore, the air that flows in through the first opening section flows around the end portion of the filter, bypasses the filter, and passes through the filter from the front face thereof. Dust that flows into the separator alongside with air is captured by the filter as a result, and stored in the separator.

In the dust collection device for a power tool of Japanese Patent No. 3448110, both air and dust contact the filter from the front face thereof. Therefore, when the filter is oriented upward as the power tool points upward during the use, for example, in case of boring in a ceiling, dust is likely to remain on the filter surface. This causes a problem of clogging. As a result, dust collection efficiency is impaired, and the filter has to be cleaned or replaced with greater frequency.

SUMMARY OF INVENTION

Therefore, it is an object of the present invention to provide a dust collection device for a power tool, and a power tool that ensure suitable dust collection efficiency and longer life of the device by suppressing filter clogging.

In order to achieve the above object, a dust collection device for a power tool according to a first aspect of the present invention includes a casing from which a suction port protrudes and which can be attached to a power tool, a dust collection pathway which is formed in the casing, and through which air sucked from the suction port passes, and a dust box that is detachably joined to a joining section provided in the casing, has a filter arranged therein, and is provided with an inlet on an upstream side of the filter, and an outlet on a downstream side of the filter, the dust box serving as part of the dust collection pathway. In the dust collection device, the filter is provided at a position at which the filter covers the outlet provided on an inner wall face of the dust box, in a state such that a filter surface projects into the dust box, a space is formed between a side face of the filter adjacent to the filter surface and an inner face of the dust box, and a guide unit is provided to guides air, which flows in through the inlet, to the space.

In the dust collection device for a power tool according to a second aspect of the present invention, in the configuration according to the first aspect, the guide unit may include a partitioning wall that is provided between the inlet and the filter and that guides the air toward the space.

In the dust collection device for a power tool according to a third aspect of the present invention, in the configuration according to the second aspect, the space may be configured to be a flow-around space that extends continuously around a periphery of the filter, and the partitioning wall is provided so as to close a gap between the inlet and the filter, excluding a merging portion in which air that flows in through the inlet merges into the flow-around space, such that air that flows around the filter is prevented from flowing toward the inlet.

In the dust collection device for a power tool according to a fourth aspect of the present invention, in the configuration according to the first aspect or the second aspect, the guide unit may include an air outlet that is formed protruding from the inlet toward the space.

In the dust collection device for a power tool according to a fifth aspect of the present invention, in the configuration according to the second aspect or the third aspect, the guide unit may include a pair of air outlets formed protruding from the inlet toward the space.

In the dust collection device for a power tool according to a sixth aspect of the present invention, in the configuration according to the first aspect, the guide unit may be provided closer to an inner wall face than the filter surface.

In the dust collection device for a power tool according to a seventh aspect of the present invention, in the configuration according to the first aspect, the space may be provided with a wall body against which air that flows into the space is caused to collide to dissipate energy thereof.

In the dust collection device for a power tool according to an eighth aspect of the present invention, in the configuration according to the first aspect, the filter may be folded in a direction that is perpendicular to the side face on which the space is formed.

In order to achieve the above object, a ninth aspect of the present invention provides a power tool to which the dust collection device for a power tool according to the first aspect is attached.

According to the first aspect and the ninth aspect, dust that flows in through the inlet of the dust box is not delivered directly to the filter surface, and thus clogging of the filter can be suppressed even if the power tool points upward during the use. Accordingly, suitable dust collection efficiency and longer life can be ensured.

According to the second aspect, in addition to the effect achieved by the first aspect, the guide unit can be formed easily by a partitioning wall.

According to the third aspect, in addition to the effect achieved by the second aspect, by employing the flow-around space, sufficient space for dust storage can be spared, and dust can be effectively prevented from being accumulated on the filter surface. Moreover, merging of air that flows around the filter with air that flows in through the inlet can be prevented, whereby swirling of dust can be suppressed yet more effectively.

According to the fourth aspect, in addition to the effect achieved by the first aspect or the second aspect, air can flow smoothly around in the flow-around space by means of the air outlet.

According to the fifth aspect, in addition to the effect achieved by the second aspect or the third aspect, air can flow into the dust box at a sufficient flow rate by curbing air resistance at the inlet.

According to the sixth aspect, in addition to the effect achieved by the first aspect, direct flow of dust onto the filter surface can be yet more effectively prevented by setting the position of the air outlet.

According to the seventh aspect, in addition to the effect achieved by the first aspect, by employing the wall body, swirling of the dust stored in the space can be suppressed, whereby more suitable dust collection device can be achieved by prevention of filter clogging.

According to the eighth aspect, in addition to the effect achieved by the first aspect, air passes through the filter surface along the folding direction of the filter, whereby the entire filter surface is made use of to filter the air uniformly. This results in longer life of the device.

BRIEF DESCRIPTION OF THE DRAWINGS

FIGS. 3A to 3C are explanatory diagrams of a duct, wherein FIG. 3A illustrates a perspective view, FIG. 3B illustrates a side view and FIG. 3C illustrates a front view.

FIGS. 4A and 4B are explanatory diagrams of a dust box and the duct, wherein FIG. 4A illustrates a side view of a box main body having part thereof cut out, and FIG. 4B illustrates a perspective view of the box main body having part thereof cut out.

FIGS. 6A to 6C are explanatory diagrams of a filter unit in a modified example, wherein FIG. 6A illustrates a perspective view, FIG. 6B illustrates a plan view and FIG. 6C illustrates a vertical cross section.

FIGS. 7A to 7C are explanatory diagrams of a filter unit in a modified example, wherein FIG. 7A illustrates a perspective view, FIG. 7B illustrates a plan view and FIG. 7C illustrates a vertical cross section.

FIG. 1213 illustrates a cross-sectional diagram along line C-C.

DETAILED DESCRIPTION OF THE PREFERRED EMBODIMENT

An embodiment of the present invention will be explained below with reference to accompanying drawings.

Figure 1:
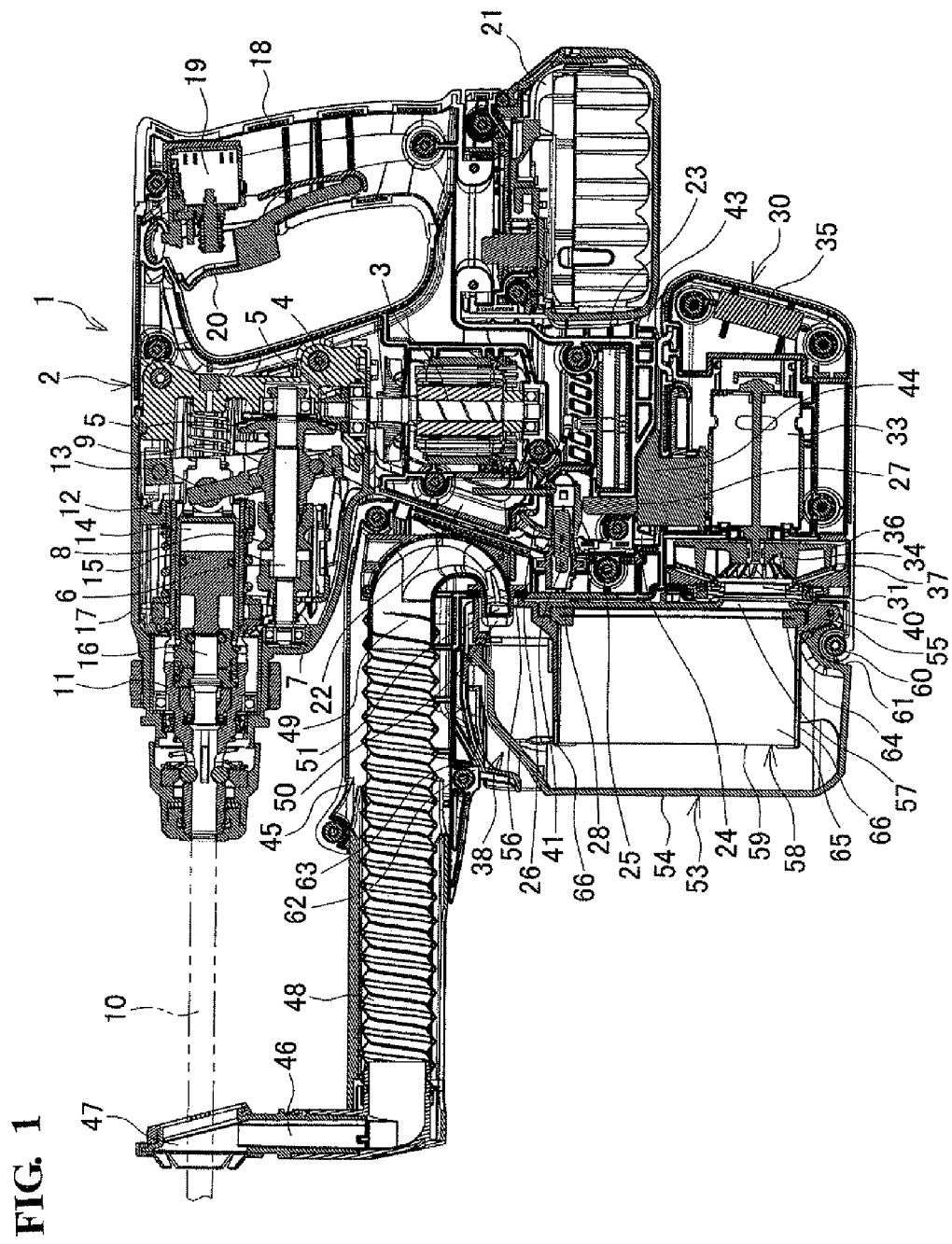
FIG. 1 is a vertical cross-sectional diagram of a hammer drill to which a dust collection device for a power tool is attached.
Figure 2:
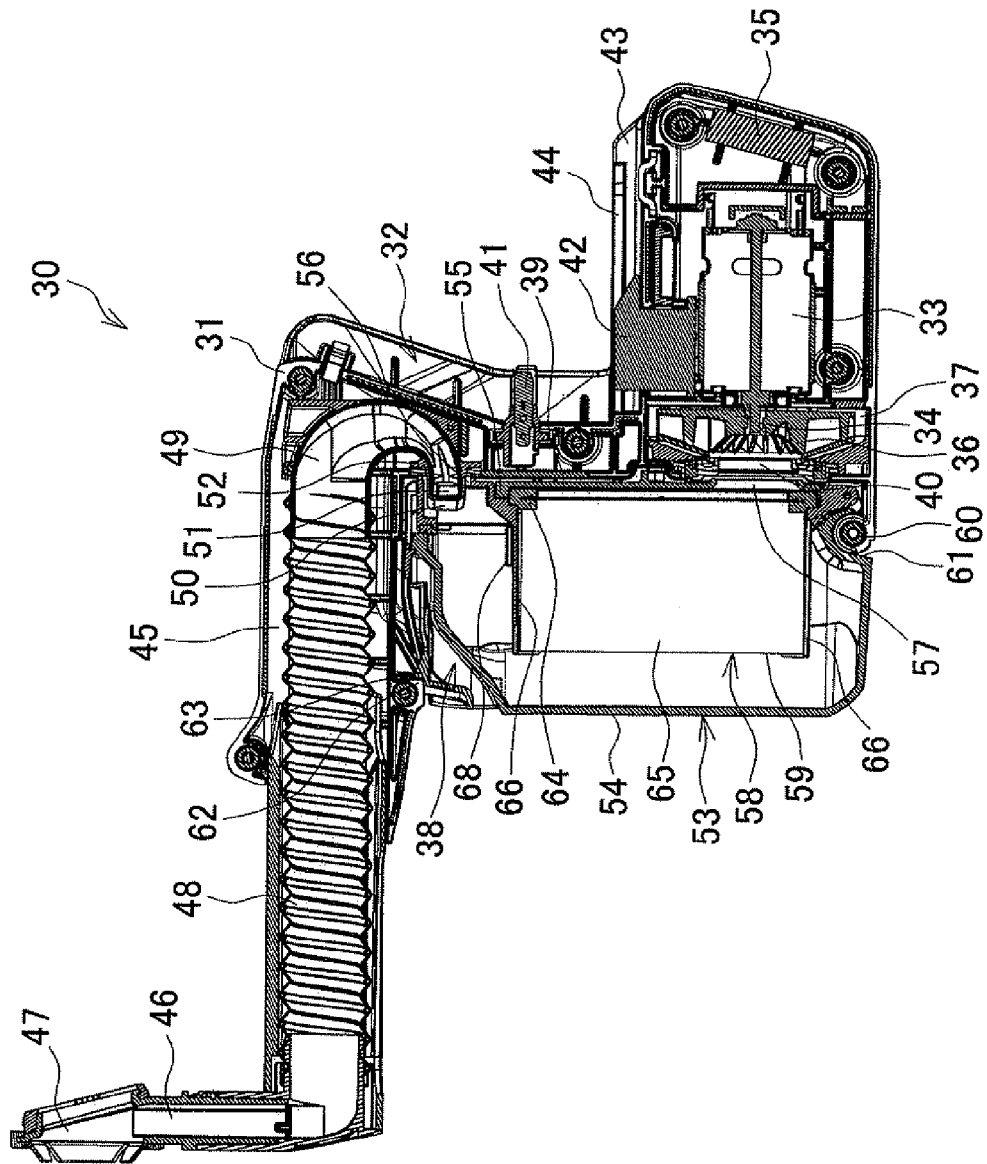
FIG. 2 is a vertical cross-sectional diagram of the dust collection device for a power tool.

FIG. 1 illustrates an example in which a dust collection device for a power tool (hereafter, "dust collection device" for short) is attached to a hammer drill, which is a power tool. FIG. 2 illustrates the dust collection device as a single unit.

In a hammer drill 1, a motor 3 is housed in a lower front portion (the left side in FIG. 1 denotes the frontward direction) of a housing 2 that is formed by assembling a pair of left and right split housings. In the hammer drill 1, an intermediate shaft 6 that receives torque via bevel gears 5, 5, is disposed above the motor 3, and a first gear 7, a clutch 8, and a boss sleeve 9 are arranged on the intermediate shaft 6 from the front. A tool holder 11 to which a bit 10 can be inserted from a leading end of the tool holder 11 is rotatably supported in parallel to the intermediate shaft 6, above the intermediate shaft 6. An arm 13 that is provided on the outer periphery of the boss sleeve 9 via a swash bearing is linked to the rear end of a piston cylinder 12 that is loosely inserted into the tool holder 11 from the rear thereof. A striker 15 is provided inside the piston cylinder 12 via an air chamber 14, in such a manner that the striker 15 is capable of moving frontward and rearward, and can strike an impact bolt 16 that is provided at the front of the striker 15. The first gear 7 meshes with a second gear 17 provided on the tool holder 11.

A handle 18 that is provided with a switch 19 and a switch lever 20 is formed in an upper rear portion of the housing 2. A battery pack 21, which serves as a power source, is attached below the handle 18. The front lower portion of the housing 2 serves as an attachment section 22 that tilts downward and frontward and protrudes into the front of the battery pack 21, and to which a dust collection device 30 is attached. A controller 23 electrically connected to a coil of the motor 3, the switch 19, and the battery pack 21, is accommodated inside the attachment section 22. A guide groove 24 whose front end opens frontward is recessed in a front-rear direction on the lower face of the attachment section 22 at the center in a left-right direction.

A connector 25, in which three female terminals for power source and for communication are disposed side by side in the left-right direction, is provided at the front of and above the controller 23. The connector 25 is shaped as a square tube whose front end is open, and is supported by mating left and right recesses (not shown) that are formed on the outer face of the connector 25 with bosses (not shown) that protrude from the inner faces of the left and right split housings. The connector 25 is supported through the mating so as to be pivotable about the bosses in the up and down direction. A shutter section 26 is a plate member that is circular shaped and centered about the bosses, and integrally formed with the front end of the upper face of the connector 25 in a manner of being oriented upward. Further, a pressing piece 27 is held below the connector 25 at the center of the lower face of the attachment section 22, in a manner so as to allow the pressing piece 27 to move in the up-down direction.

A square insertion slot 28 is formed to open at the front of the connector 25 arranged on the front face of the attachment section 22. The connector 25 is pivoted to revolve between an upper connection position and a non-connection position. The upper connection position is at which the shutter section 26 withdraws above the insertion slot 28, and an opening is positioned directly behind the insertion slot 28. The non-connection position is at which the shutter section 26 is positioned directly behind the insertion slot 28, and the opening withdraws below the insertion slot 28. In a state where the dust collection device 30 is not attached, however, a torsion spring (not shown) pivotally urges the connector 25 to the non-connection position at which the shutter section 26 closes the insertion slot 28. At this non-connection position, the connector 25 that withdraws downward presses the pressing piece 27, and thereby protrudes into the guide groove 24 through the attachment section 22.

The dust collection device 30 has a casing 31 that is L-shaped in a side view and formed by assembling the left and right split casings. A mating recess 32 that mates with the attachment section 22 of the hammer drill 1 is formed in the upper right portion of the dust collection device 30. A motor 33 having an output shaft 34 pointing frontward is accommodated in a transverse manner at the rear of the casing 31. A controller 35 is provided at the rear of the motor 33. A dust collection fan 36 is fixed to the output shaft 34, and is accommodated in an intake chamber 37. The intake chamber 37 is provided with an exhaust outlet (not shown) on a side face and is defined by partitioning the interior of the casing 31. The reference numeral 38 denotes a joining section of a dust box that is formed in the casing 31 at the front of the intake chamber 37, and formed as a recess that is open only at the front. A communicating hole 40 through which the joining section 38 communicates with the intake chamber 37 is formed in a partitioning wall section 39 that serves as the bottom of the joining section 38, to be coaxial with the dust collection fan 36.

Three plate-like male terminals 41, 41 ... for power supply and for communication are disposed side by side at predetermined intervals in the left-right direction on the rear face in the upper portion of the casing 31, and protrude rearward.

A pressing rail 42 that mates with the guide groove 24 of the attachment section 22 protrudes in the front-rear direction, on the upper face in the rear portion of the casing 31. An inclined face whose height decreases rearward is formed at the rear end of the pressing rail 42. A pair of guide rails 43 is erected in the front-rear direction, on the left and right sides of the pressing rail 42, at an interval that allows the lower portion of the attachment section 22 to be mated. Elongated projections 44 that are capable of mating with joining grooves (not shown) provided on the side faces of the attachment section 22 protrude inward from the upper ends of the guide rails 43, respectively.

Figure 3A:
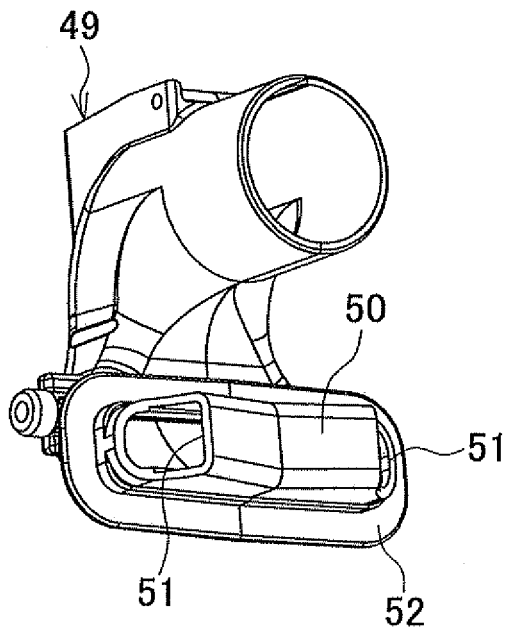
Figure 3B:
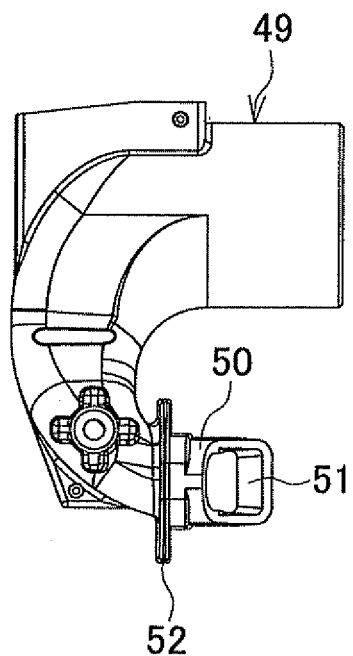
Figure 3C:
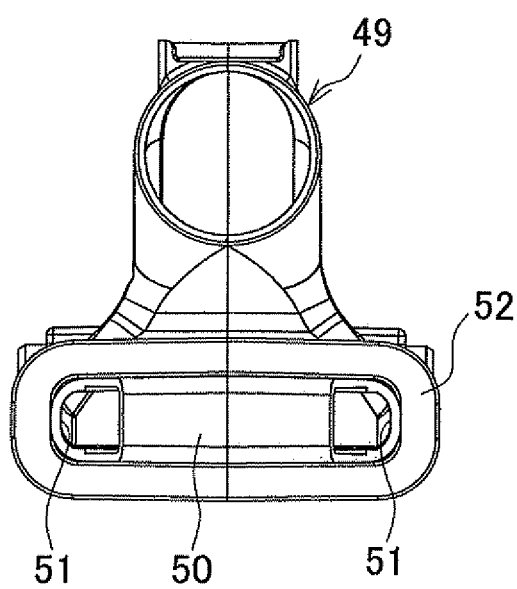

A guide passage 45 is formed above the joining section 38 in the front-rear direction such that the front end thereof is open and the rear end turns to form a U-shape, to come around behind the joining section 38. An L-shaped nozzle 46 is linked to the front end of the guide passage 45. The leading end of the nozzle 46 includes a suction port 47, and protrudes upward. A flexible hose 48 is continuously accommodated both in the nozzle 46 and in the guide passage 45. A tubular duct 49 is bent in a U-shape that conforms to the rear end shape of the guide passage 45, and is linked to the rear end of the flexible hose 48. As illustrated in FIG. 3, the upper portion of the duct 49 is cylinder shaped, and the lower portion thereof is formed as a horizontally long rectangular tube. A leading end section 50 of the lower portion of the duct 49 branches in a V-shape, to the left and right, so that a pair of left and right air outlets 51, 51, which serves as a guide unit, are opened obliquely frontward. With the duct 49 attached, the leading end section 50 runs through the partitioning wall section 39 and protrudes into the joining section 38. The reference numeral 52 denotes a flange provided to surround the rear portion of the leading end section 50 such that the flange 52 is brought into contact with the rear face of the partitioning wall section 39 so as to position the leading end section 50 when attached.

Figure 4A:
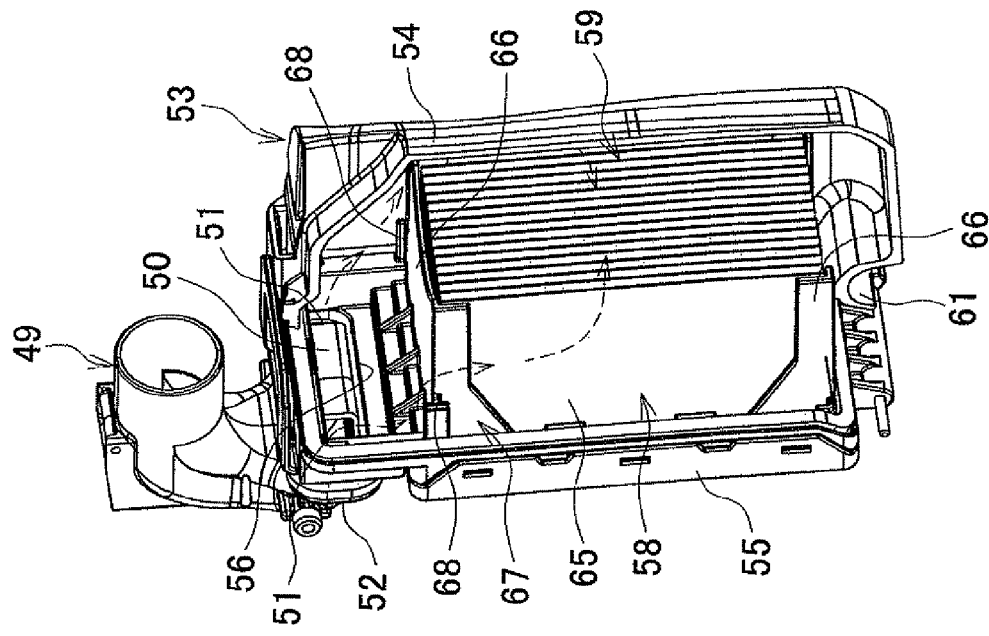
Figure 4B:
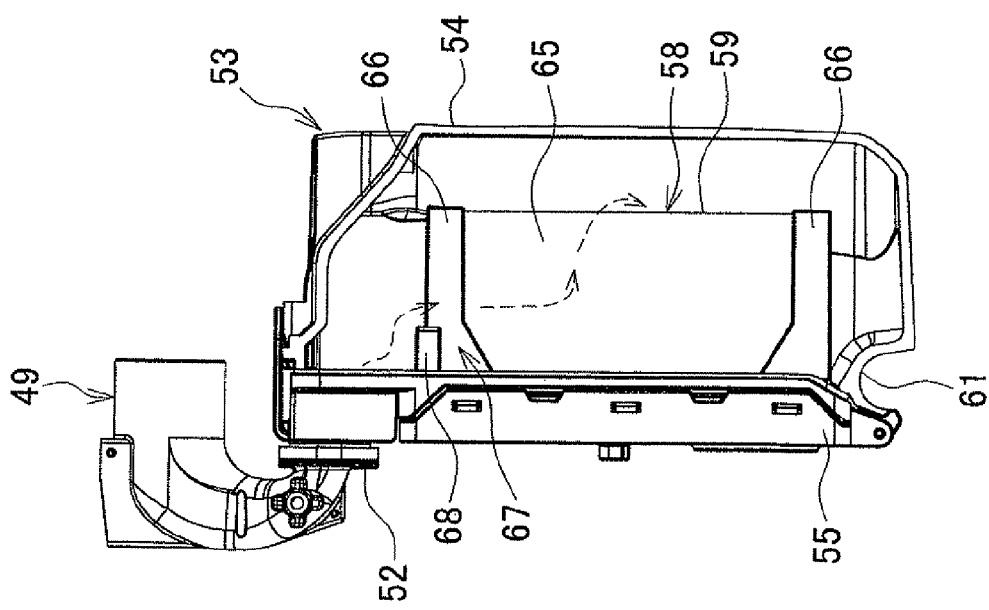
Figure 5:
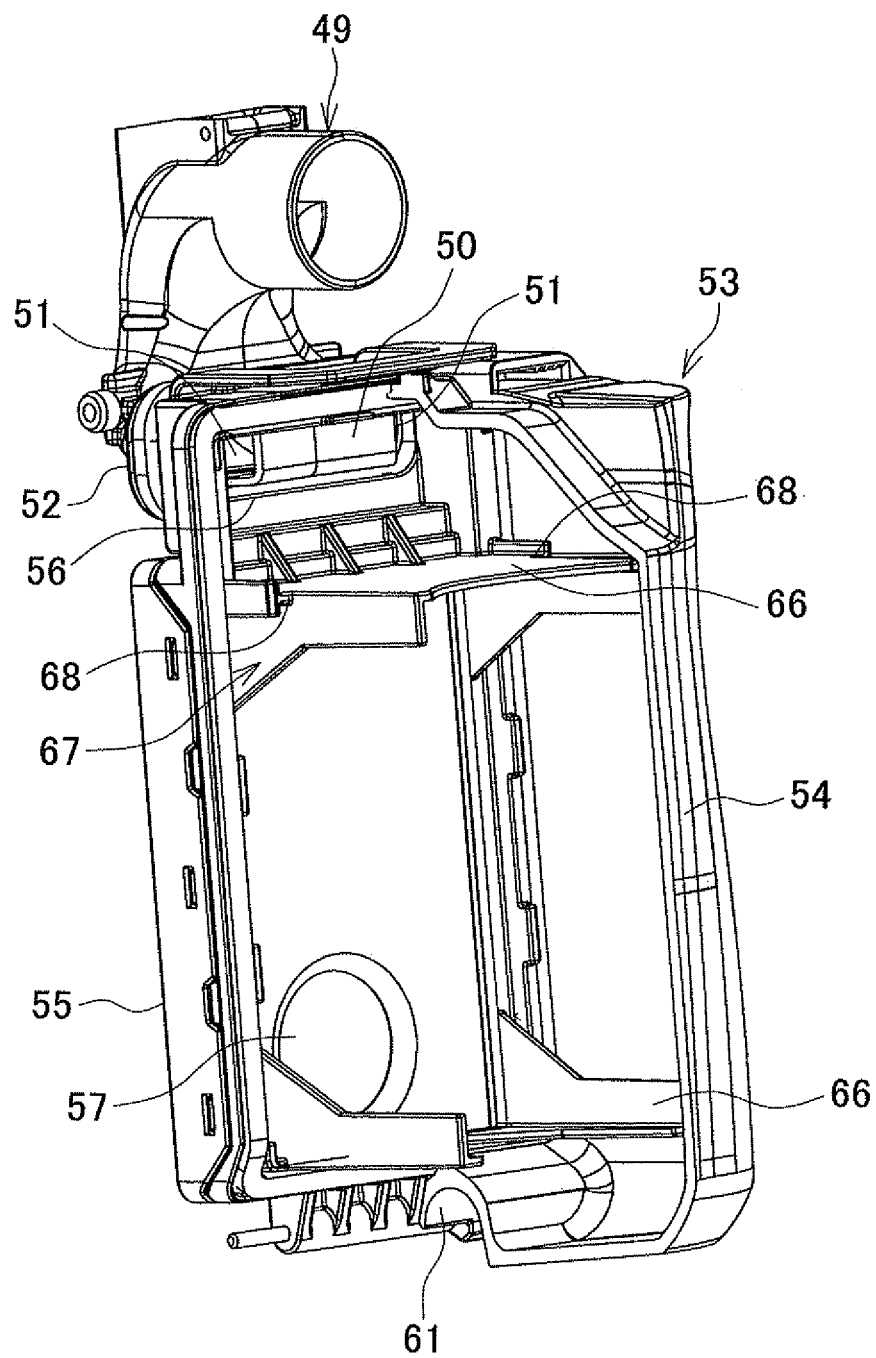
FIG. 5 is a perspective-view diagram of the dust box in which part of the box main body is cut out (illustration of a filter unit omitted).

A dust box 53 is detachably attached to the joining section 38. As illustrated in FIGS. 4 and 5, the dust box 53 is provided with the box main body 54 shaped as a cuboid and a lid body 55 that is hinged to an opening of the box main body 54. An inlet 56, having a horizontal rectangular shape, is formed on one side of the lid body 55 in the longitudinal direction, and a circular outlet 57 is formed on the other side. A filter unit 58 is provided at a position at which the filter unit 58 covers the outlet 57, in a state such that a filter surface 59 projects into the box main body 54 from the rear face of the lid body 55.

A groove 61 that mates with a shank 60 extending in the left-right direction and provided at the lower end of the joining section 38 is formed on one of the end faces of the box main body 54 in the lateral direction. A latching piece 63, which is elastically latched to a latching protrusion 62 provided on the upper inner face of the joining section 38, is formed on the other of the end faces of the box main body 54 in the lateral direction. The dust box 53 is attached to the joining section 38 through latching of the latching piece 63 to the latching protrusion 62, by mating the groove 61 to the shank 60 from the front in such a manner as to vertically raise the dust box 53. In the state where the dust box 53 is attached to the joining section 38, the leading end section 50 of the duct 49 fits into the inlet 56 and protrudes into the box main body 54, and the outlet 57 faces the communicating hole 40.

In the filter unit 58, a filter 65 is made of paper folded in the lateral direction such that the folds are parallel to the longitudinal direction of the frame 64, and is attached to a rectangular frame 64 that is fitted to the lid body 55. A pair of C-shaped support walls 66, 66 is formed on the rear face of the lid body 55 serving as an inner wall face of the dust box 53, such that the support walls 66, 66 close the front and rear ends of the filter 65 in the longitudinal direction through mating of the frame 64 with the support walls 66 on the base end side. As a result, the filter unit 58 is held on the lid body 55 in a state where both side faces of the filter 65 in the left-right direction and the filter surface 59 having parallel mountain-fold lines are exposed.

With the filter unit 58 thus held, left and right spaces 67, 67 are formed in the longitudinal direction between the side faces of the filter 65 and the inner faces of the box main body 54, so as to allow air that flows in and is divided by the air outlets 51, 51 of the leading end section 50 of the duct 49 to separately flow into the left and right spaces 67, 67. Wall bodies 68, 68 are respectively formed in the gaps between the left and right inner faces of the box main body 54 and the upper support wall 66. The gaps serve as inlets of the spaces 67. The wall bodies 68, 68 respectively close the spaces 67 to a depth that is approximately one-third of that of the support wall 66.

When the dust collection device 30 is attached to the hammer drill 1 having the above configuration, the dust collection device 30 is caused to slide rearward in such a manner that the mating recess 32 mates with the attachment section 22 from the front in a state where the attachment section 22 is positioned at the rear of and above the casing 31 through matching of the guide rails 43, 43 of the casing 31 to the lower portion of the attachment section 22 of the hammer drill 1. Thereupon, the pressing rail 42 of the dust collection device 30 and the elongated projections 44 of the guide rails 43 slide rearward with the pressing rail 42 mating with the guide groove 24 of the attachment section 22, and the elongated projections 44 mating the joining grooves. The pressing rail 42 abuts the pressing piece 27, but the pressing piece 27 is pushed upward by the inclined face. As a result, the connector 25 moves to a connection position at which the shutter section 26 withdraws upward and thus an opening becomes positioned directly behind the insertion slot 28.

Thereafter, the male terminals 41 of the dust collection device 30 enter the housing 2 through the opened insertion slot 28, and the attachment section 22 mates with the mating recess 32 and the male terminals 41 are inserted into the female terminals at the same time, whereby electrical connection is established therebetween (FIG. 1).

When the switch 19 is switched on by pressing the switch lever 20 of the hammer drill 1, the motor 3 is driven to rotate the intermediate shaft 6. Thereupon, a mode can be selected among a drill mode in which the tool holder 11 rotates via the second gear 17 to rotate the bit 10, a hammer mode in which the piston cylinder 12 reciprocates as the arm 13 rocks, and the striker 15 moving in association with the piston cylinder 12 strikes the bit 10 via the impact bolt 16, and a hammer drill mode in which the tool holder 11 rotates and the impact bolt 16 is struck at the same time, by operating the clutch 8 to slide from outside the housing 2 to select any of a forward position at which the clutch 8 engages with the first gear 7 only, a backward position at which the clutch 8 engages with the boss sleeve 9 only, and an intermediate position at which the clutch 8 engages with both the first gear 7 and the boss sleeve 9.

When the switch 19 is switched on, the controller 23 causes power to be supplied to the controller 35 of the dust collection device 30. As a result, the controller 35 drives the motor 33 to rotate the dust collection fan 36. This causes outside air to be sucked through the suction port 47 of the nozzle 46, and the sucked air passes through the flexible hose 48 and the duct 49, and is discharged into the dust box 53 via the air outlets 51, 51 of the leading end section 50.

As indicated by the dotted lines in FIG. 4, the air discharged through the air outlets 51, 51 of the duct 49 collides against the wall bodies 68, 68, the energy of the air is thereby dissipated, and then the air flows around the wall bodies 68 and into the spaces 67, 67. Thereafter, the air passes around onto the front of the filter unit 58, and passes through the filter 65 from the filter surface 59. The air then reaches the intake chamber 37 via the communicating hole 40 from the outlet 57, and is discharged to the exterior via an exhaust outlet (not shown) that is provided in the intake chamber 37. Therefore, the dust generated from the workpiece is sucked into the suction port 47, enters the dust box 53 via the nozzle 46, the flexible hose 48 and the duct 49, is captured by the filter 65, and is stored in the box main body 54.

In a case where the hammer drill 1 is used pointing upward, such as during boring in a ceiling, part of the dust that flows into the dust box 53 together with air is stored in the spaces 67, 67 on the left and right sides of the filter 65, before reaching the filter surface 59 that is oriented upward. Even if dust is stored on both sides as described above, the energy of air flowing in from the air outlets 51, 51 of the duct 49 is dissipated by the wall bodies 68, 68, and hence the inflowing air causes little swirling of stored dust in the box main body 54.

When the switch 19 is switched off by releasing pressing on the switch lever 20, the motor 3 stops to stop rotation of the bit 10 and the like. However, the controller 23 has a delay function of discontinuing energization of the dust collection device 30 several seconds after switching-off of the switch 19. Therefore, the dust collection fan 36 continues rotating in the dust collection device 30 for several seconds even after the bit is stopped. Dust remaining at the nozzle 46, the flexible hose 48 and so forth can be reliably recovered thereby in the dust box 53.

To remove the dust collection device 30, the dust collection device 30 is caused to slide frontward off the hammer drill 1, in a direction opposite to that during the attachment thereof. Thereupon, the dust collection device 30 slides frontward, guided along the pressing rail 42 by the guide groove 24 and guided along the elongated projections 44 by the joining groove. In response thereto, the male terminals 41 come off the connector 25 and are drawn out of the insertion slot 28. The connector 25 is released from upward pressing by the pressing piece 27 as the pressing rail 42 moves frontward, and then returns to the non-connection position due to urging by the torsion spring. As a result, the shutter section 26 again closes the insertion slot 28.

In the dust collection device 30 and the hammer drill 1 according to the above embodiment, thus, the filter 65 is provided on the rear face of the lid body 55 at a position at which the filter 65 covers the outlet 57 provided on the rear face of the lid body 55, in a state such that the filter surface 59 projects into the dust box 53 from the rear face of the lid body 55. Further, the spaces 67 are respectively formed between the inner faces of the box main body 54 and the side faces of the filter 65 adjacent to the filter surface 59, and a guide unit (air outlets 51, 51) that guides air that flows in through the inlet 56 toward the spaces 67. As a result, dust that flows in through the inlet 56 is not delivered directly toward the filter surface 59, even if the hammer drill 1 points upward during the use. Accordingly, clogging of the filter 65 can be suppressed, and thus suitable dust collection efficiency and longer life of the device can be ensured.

In particular, the spaces 67 are provided between the inner faces of the box main body 54 and the side faces of the filter 65 that are on the opposite sides from each other. The guide unit is configured as the pair of air outlets 51, 51 that protrudes from the inlet 56 and that is formed branching toward the spaces 67, 67 on both side faces. Therefore, the spaces 67 with sufficient size for storing dust can be obtained.

Moreover, direct flow of dust toward the filter surface 59 can be prevented yet more effectively by providing the air outlets 51, 51 at a position closer to the rear face of the lid body 55 than the filter surface 59.

Further, the wall bodies 68, 68 are respectively provided between the spaces 67, 67 and the air outlets 51, 51 such that the air flowing in through the inlet 56 collides against the wall bodies 68, 68 to dissipate the energy of the air. Therefore, there is little swirling of dust stored in the spaces 67, which is more suitable for preventing clogging of the filter 65. Moreover, the filter 65 is folded in a direction that is perpendicular to the side faces on which the spaces 67 are formed. Hence, air passes through the filter surface 59 along the folding direction of the filter 65, whereby the entire filter surface 59 is made use of to filter the air uniformly. This results in longer life of the device.

In the above embodiment, the air outlets are formed at the leading end section of the duct, but the configuration of the air outlet is not limited thereto, and the portion having the air outlet may be provided separately from the duct, and may be provided integrally with the inlet of the lid body.

The inlet is disposed on the rear face side of the lid body, but the inlet may be provided not in the lid body but on the inner face of the box main body and the air outlet may be provided at that position. The location of the air outlet is not necessarily limited to an example where the air outlet is closer to the inner wall face on the outlet side than the filter surface. The air outlet may be at the same position as the filter surface, or at a frontward position in a protruding direction of the filter surface, so long as dust does not strike directly the filter surface due to, for example, the orientation of the air outlet.

As to the dust box itself, the lid body may be disposed on the upper side, on the front side or the lateral side, depending on the configuration of the dust collection pathway. Therefore, the filter position may be changed to a position on the inner face on the front side, the inner face on the lower side, or the inner face on the lateral side, in accordance with the position of the outlet of the air passage in the dust box. In this case, a space may be provided up to the inner face of the dust box, in accordance with the position of the filter. This space is not limited to a configuration in which a pair of spaces is provided on both sides of the filter, and the space may be provided at only one side of the filter. Not only the height and position of the wall body may be modified but also the wall body may be omitted.

Figure 7B:
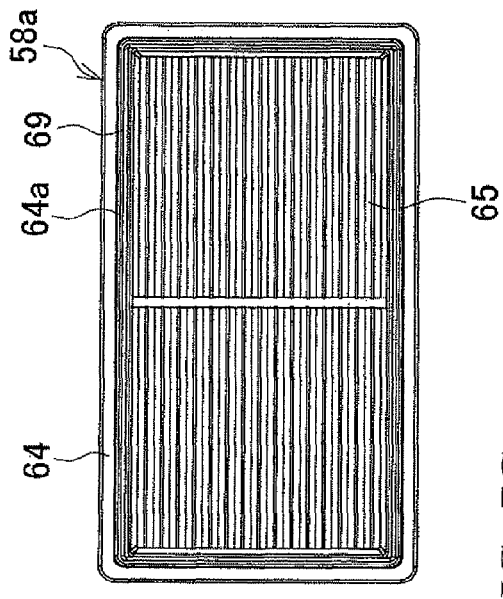
Figure 7C:
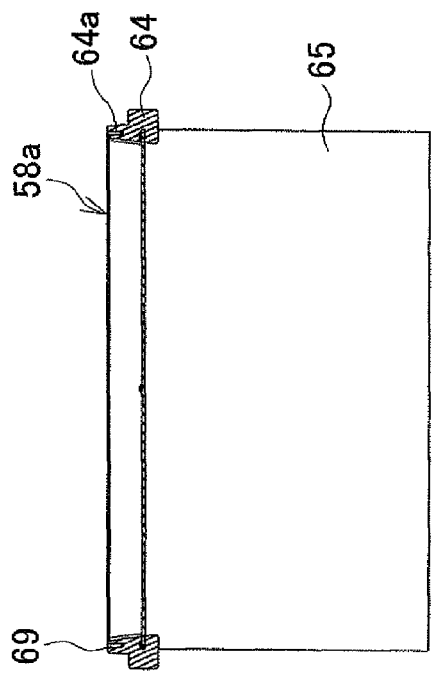
Figure 7A:
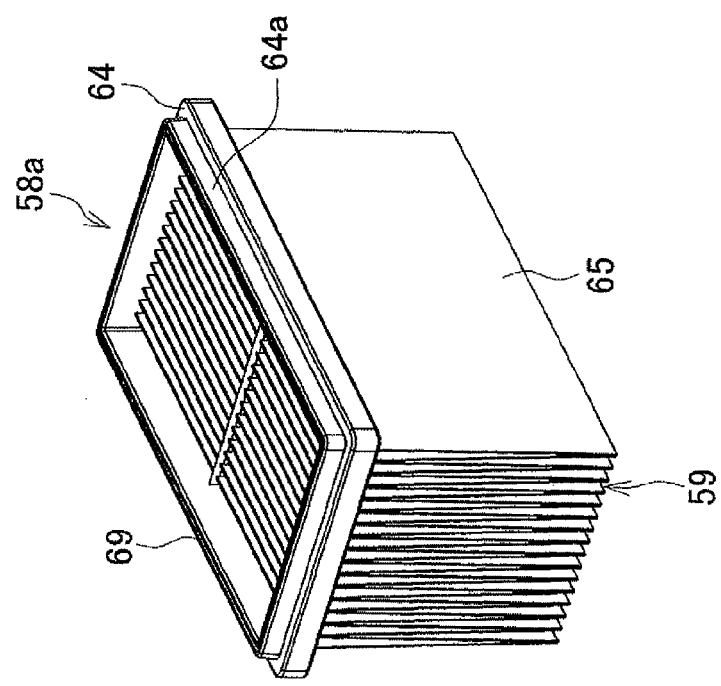
Figure 8:
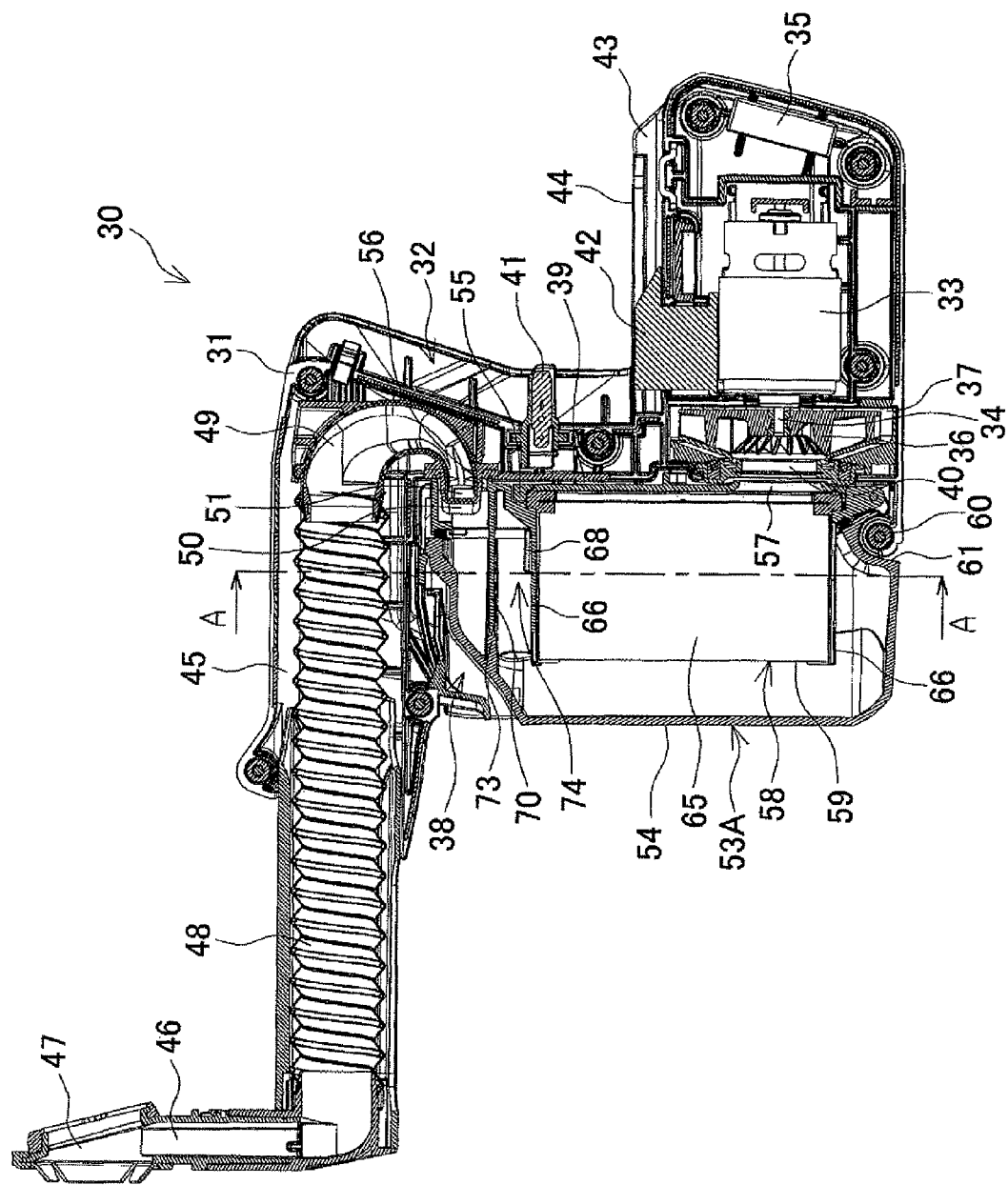
FIG. 8 is a vertical cross-sectional diagram of a dust collection device for a power tool in a modified example.

In the above embodiment, the outlet of the air passage provided in the dust box is a circular outlet that faces the communicating hole. However, the outlet may have a rectangular shape into which the frame of the filter unit fits. In this case, a seal section 64*a* may be peripherally provided, as illustrated in FIG. 6, on an end face of the frame 64, such that the leading end of the seal section 64*a* abuts the partitioning wall section 39 so as to thereby seal the gap between the frame 64 and the partitioning wall section 39. A groove 69 may also be peripherally provided on the end face of the seal section 64*a*, as in the case of the filter unit 58*a* illustrated in FIG. 7, such that the groove 69 serves as a double lip that abuts the partitioning wall section 39.

In the above embodiment, air that is blown through the inlet into the dust box flows into each of spaces on the both sides of the filter, and is thereafter caused to come around onto the front of the filter. However, the air may be caused to come around onto the front of the filter after flowing around the filter.

FIGS. 8 to 12 illustrate one example of such a configuration. In a dust box 53A illustrated in the drawings, a first partitioning wall 70 that is parallel to the support walls 66 is erected on the rear face of the lid body 55 between one of the support walls 66 and the leading end section 50 of the duct 49, in such a manner that the first partitioning wall 70 closes the gap between the leading end section 50 and one of the spaces, that is, a space 67B. The first partitioning wall 70 is bent so as to come closer to the support wall 66 thereby forming a bent section 71 and is linked to the support wall 66 on the side of the other of the spaces, that is, a space 67A. A cutout 72 is formed at the upper end of the bent section 71.

A second partitioning wall 73 is erected on the inner face of the box main body 54, and when the lid body 55 is closed, the leading end of the second partitioning wall 73 is close to the first partitioning wall 70, and the first partitioning wall 70 and the second partitioning wall 73 are positioned substantially on the same plane. On the space 67A side, the second partitioning wall 73 is not bent conforming to the bent section 71 of the first partitioning wall 70, and remains flat to be linked to the box main body 54.

The leading end section 50 and the filter 65 are partitioned by the first and second partitioning walls 70, 73. In the dust box 53A, the space at which the leading end section 50 is disposed communicates only with the space 67A, goes around the filter 65 in this state, and reaches the space 67B, whereby a flow-around space 74 is formed that passes between one of the support walls 66 and the first partitioning wall 70 to communicate again with the space 67A through the cutout 72. On the side of the lid body 55 of the flow-around space 74, air collides against the bent section 71 and is led, as a result, toward the box main body 54. Except for the dust box 53A, the configurations of the dust collection device 30 and the hammer drill 1 are identical to the above-described embodiment.

Figure 9:
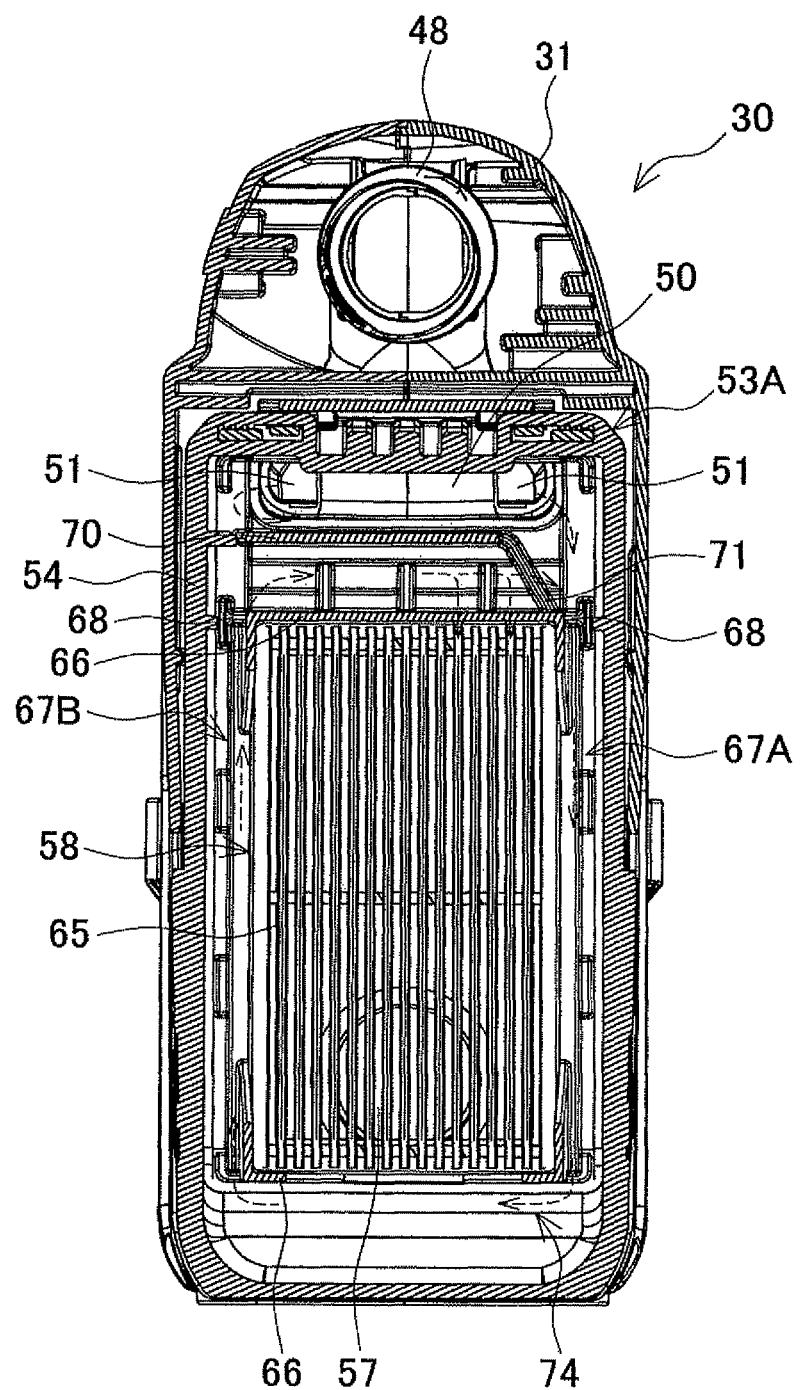
FIG. 9 is a cross-sectional diagram along line A-A in FIG. 8.
Figure 10:
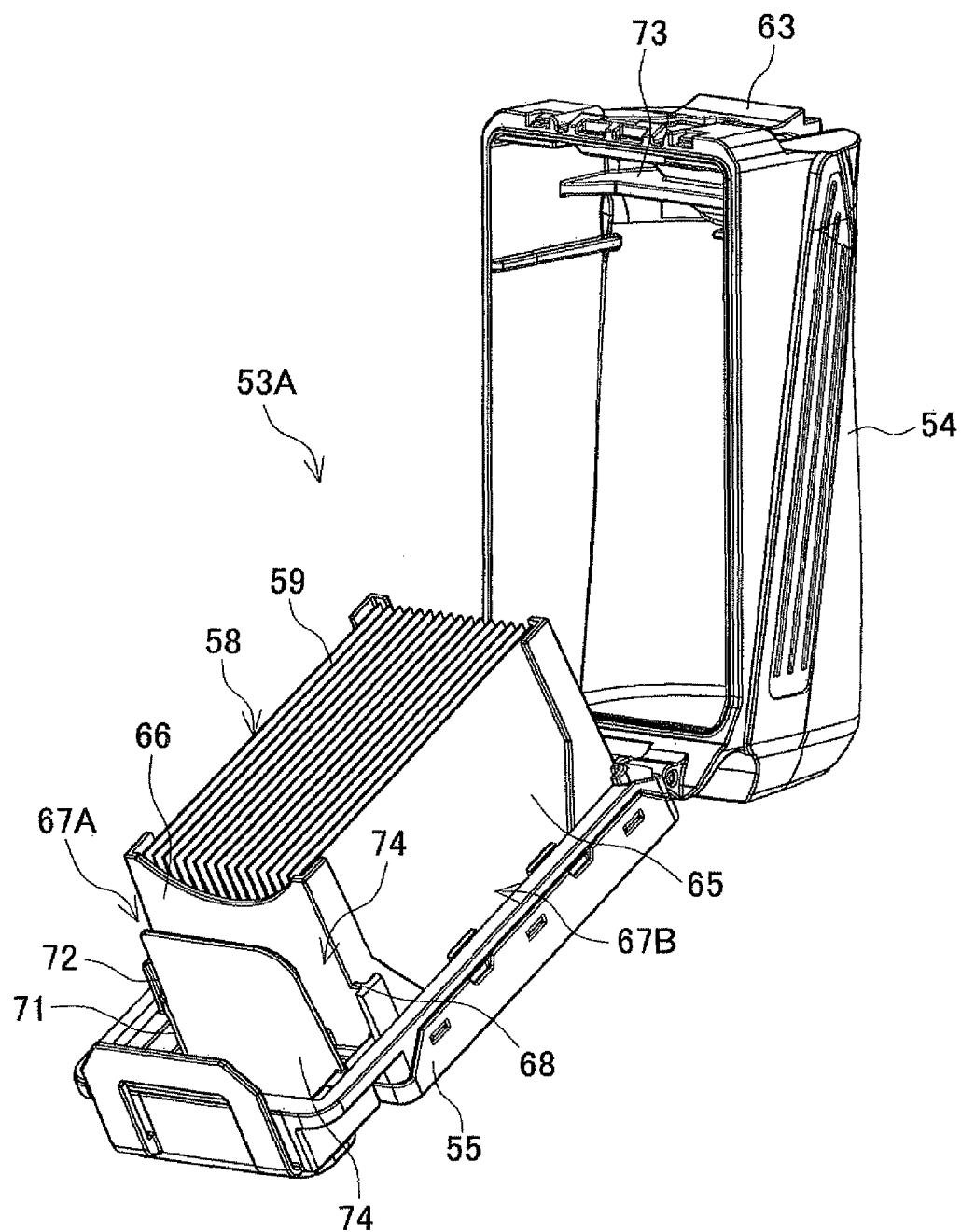
FIG. 10 is a perspective-view diagram of a dust box in a state where a lid body is open.
Figure 11:
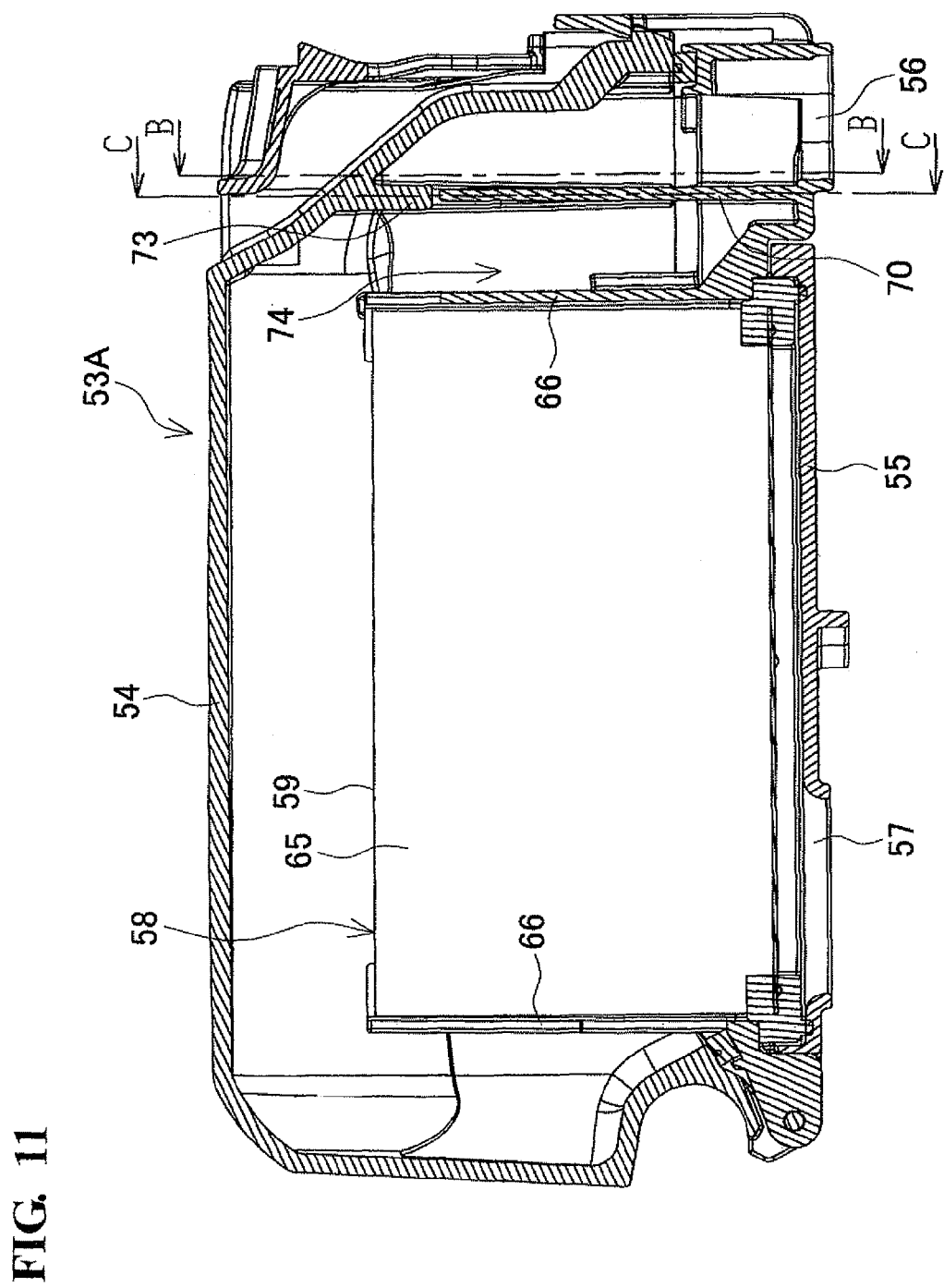
FIG. 11 is a vertical cross-sectional diagram of the dust box.
Figure 12A:
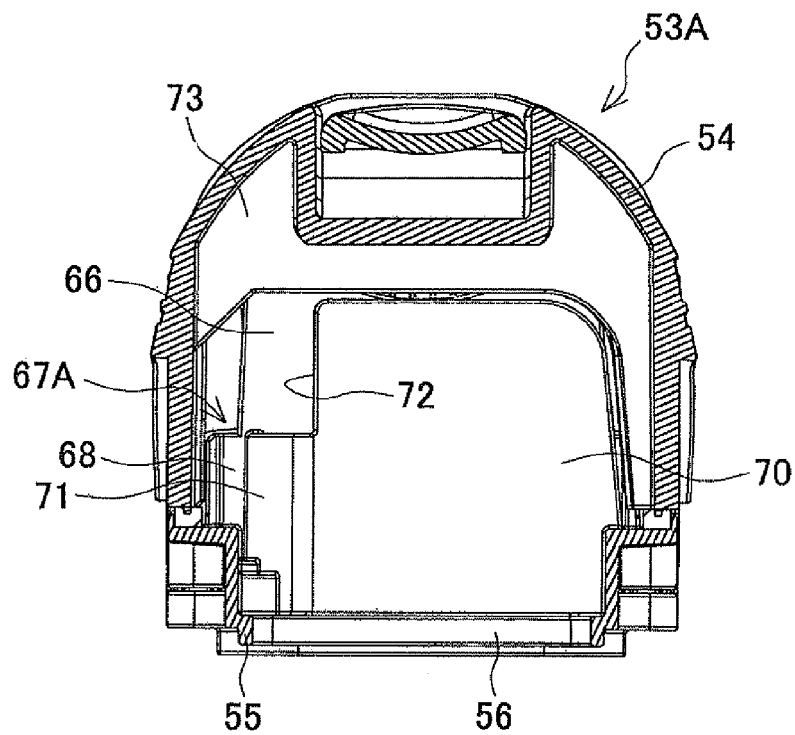
FIG. 12A illustrates a cross-sectional diagram along line B-B in FIG. 11.
Figure 12B:
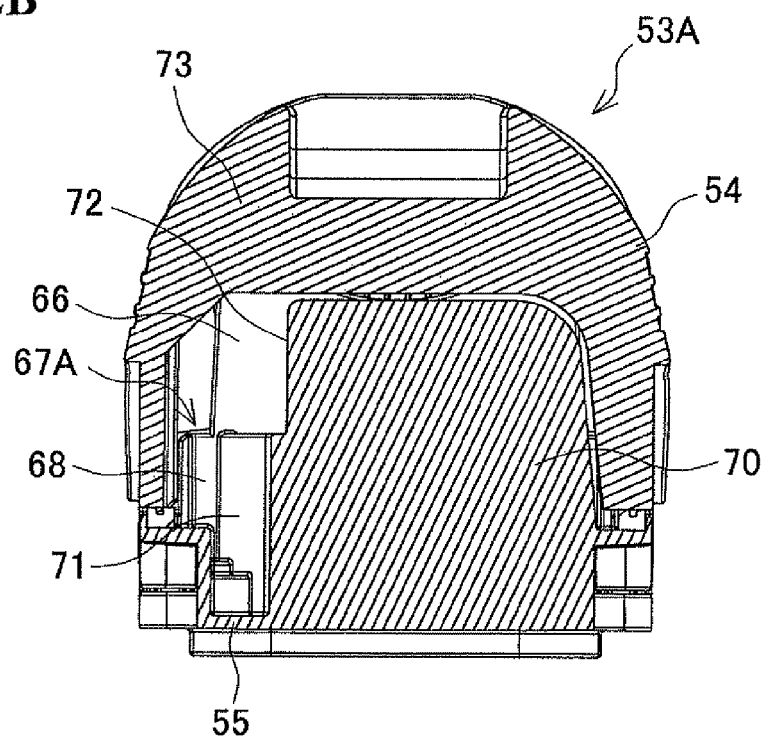

In the dust box 53A, therefore, air that is discharged through the air outlets 51, 51 of the duct 49 is blocked by the first and second partitioning walls 70, 73 and is led to the flow-around space 74, as indicated by the dotted lines in FIG. 9. That is, air once collides against the wall bodies 68, whereupon the energy thereof is dissipated. Thereafter, the air flows into the space 67A, flows around the filter 65, and then flows into the space 67B. The air collides once more against the wall bodies 68, whereby the energy thereof is dissipated, and thereafter reaches the gap between the support wall 66 and the first partitioning wall 70. Herein, part of the air collides against the bent section 71, as a result of which the direction of the air is changed to flow toward the box main body 54, and then, the air comes around onto the front of the filter unit 65 and passes through the filter 65 from the filter surface 59. However, other part of the air flows once more into the flow-around space 74, through the cutout 72, and flows around the filter 65. The air that has passed through the filter 65 reaches the intake chamber 37 via the communicating hole 40 through the outlet 57, and is discharged to the exterior.

By causing air to flow around the flow-around space 74 as described above, dust that flows into the dust box 53A together with the air is stored, for example, in the left and right spaces 67A, 67B and between the support wall 66 and first partitioning wall 70, around the periphery of the filter 65. The wall body 68 on the space 67B side and the bent section 71 dissipate air energy and block dust that flows around the filter 65, and thereby elicit the effect of causing the dust to be stored in the flow-around space 74. In this modified example as well, therefore, dust that flows in through the inlet 56 does not aim directly to the filter surface 59. Accordingly, clogging of the filter 65 can be suppressed even if the hammer drill 1 points upward during the use, and thus suitable dust collection efficiency and longer life of the device can be ensured. Further, this achieves less swirling, inside the box main body 54, of dust that is stored around the periphery of the filter 65.

In particular, the space between the side face of the filter 65 and the inner face of the dust box 53A is provided as the flow-around space 74 that extends continuously around the periphery of the filter 65. The guide unit is provided between the inlet 56 and the filter 65, and has the first and second partitioning walls 70, 73 that guide air toward the direction in which the air flows around to the flow-around space 74. Therefore, the guide unit can be formed easily by the first and second partitioning walls 70, 73, while sufficient space is spared for dust storage, whereby dust can be effectively prevented from accumulating on the filter surface 59.

The first and second partitioning walls 70, 73 are provided so as to close the gap between the inlet 56 and the filter 65, excluding the merging portion in which the air that flows in via the inlet 56 merges into the flow-around space 74. Air that flows around the filter 65 is thereby prevented from flowing toward the inlet 56. Accordingly, this allows prevention of merging between the air that flows around and the air that flows in through the inlet 56, and allows suppressing, yet more effectively, of swirling of dust.

By configuring the guide unit to include the air outlets 51 that are formed protruding from the inlet 56 toward the flow-around space 74, air can smoothly flow around at the flow-around space 74. In particular, the air outlets 51 are provided as a pair thereof, and hence air can flow into the dust box 53A at a sufficient flow rate, while curbing air resistance at the inlet 56.

In this modified example, the pair of air outlets 51, 51 is provided at the leading end section 50 of the duct 49, but air may be discharged toward the flow-around space 74 by omitting the air outlet 51 that is farther away from the space 67A, and by providing only the air outlet 51 that is closer to the space 67A.

The position of the bent section 71 and the cutout 72 may be the reverse of that in the above modified example, such that the flow-around direction may be changed so that the air flows around from the space 67B side.

So long as a partitioning wall allows air to be guided to the flow-around space, the bent section or the cutout may be omitted, or one of the two partitioning walls may be omitted, and the partitioning wall may be provided in only either the lid body or the box main body. If the lid body has a structure in which opening and closing thereof is implemented by means of a hinge, as in the above embodiment, then the extent of protrusion of the partitioning wall can be restricted, and interference upon opening and closing of the lid body can be avoided, by providing partitioning walls at the lid body and the box main body respectively, as in the above modified example.

The interior of the dust box need not necessarily be partitioned completely by the partitioning walls. In the above modified example, for example, air can still flow around even if the second partitioning wall is omitted and the lid body is provided with the first partitioning wall only.

Figure 13:
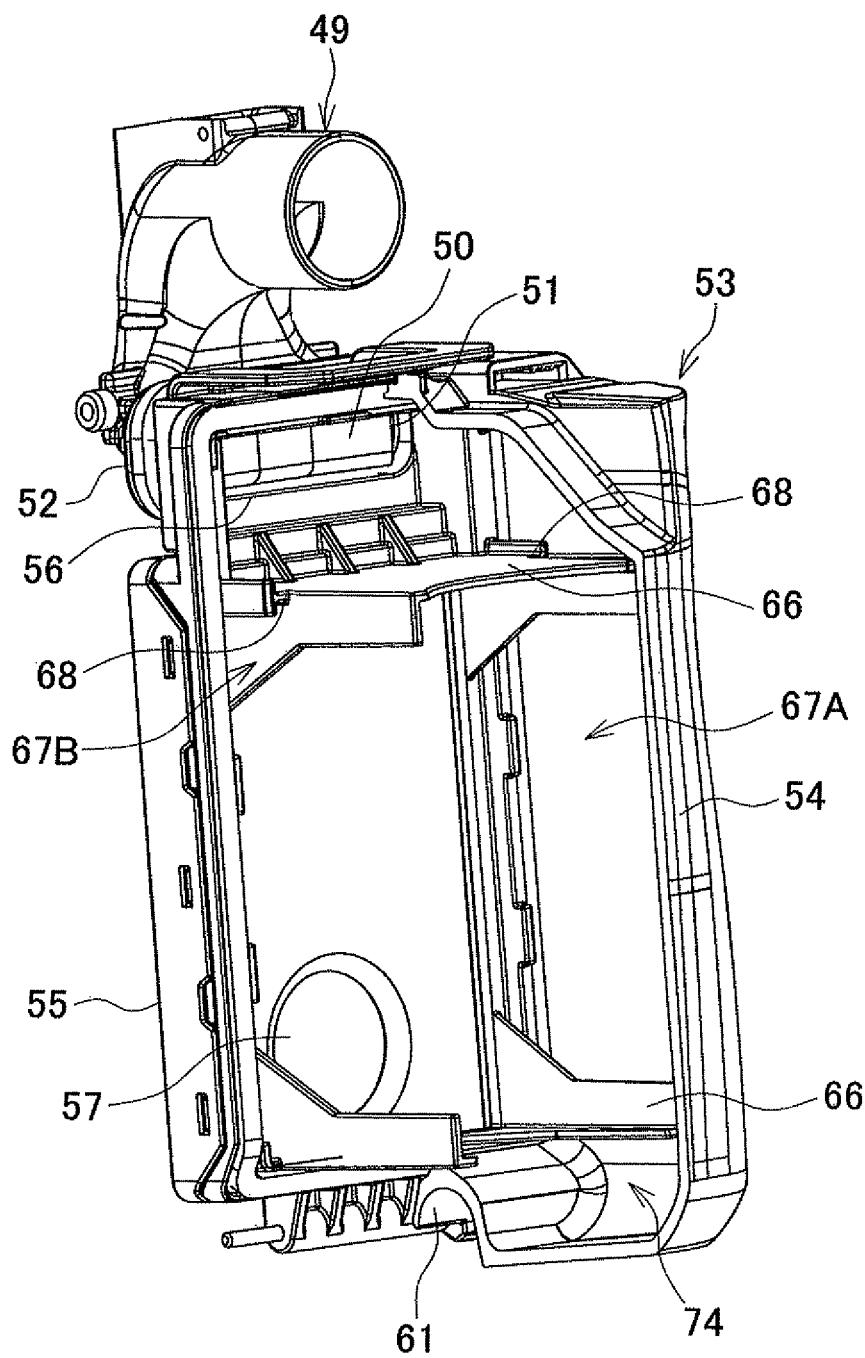
FIG. 13 is a perspective-view diagram of a modified example of a dust box in which part of a box main body is cut out (illustration of the filter unit omitted).

Air may be caused to flow around in the flow-around space 74 of the filter 65 by omitting the partitioning walls themselves, and, for example, as illustrated in FIG. 13, by providing the leading end section 50, whose air outlets 51 is pointed toward only one of flow-around directions (only toward the space 67A in FIG. 13). In this case, the leading end section may be formed in a nozzle shape that protrudes toward the flow-around space 74.

Conversely, air may be guided so as to flow around the periphery of the filter only by mean of a partitioning wall provided between the inlet and the filter, without causing the duct to protrude, unlike the leading end section having the air outlet.

In the configuration of the hammer drill, the arrangement of the motor and/or the battery pack may also be modified, and the connector may be provided so as not to pivot, but be slidable in the up-and-down direction or left-right direction between the connection position and the non-connection position, such that the connector is urged to the non-connection position by an urging unit such as a coil spring or a leaf spring. Supply of power to the dust collection device may also be suitably modified, for example, by reversing the relationship between male terminals and female terminals, or by providing, in place of terminal insertion, terminal sections may be provided at joining portions between the attachment section and the mating recess such that the terminal sections abut each other. Needless to say, the present invention is not limited to hammer drills, and may be used in other power tools, such as electric drills, so long as the dust collection device can be attached to the tool.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A dust collection device for a power tool, comprising:
   a casing from which a suction port protrudes and which can be attached to a power tool;
   a dust collection pathway which is formed in the casing, and through which air sucked from the suction port passes; and
   a dust box detachably joined to a joining section provided in the casing having a filter arranged therein, being provided with an inlet on an upstream side of the filter and an outlet on a downstream side of the filter, and serving as part of the dust collection pathway, wherein
   the filter is provided at a position at which the filter covers the outlet provided on an inner wall face of the dust box, in a state such that a filter surface projects into the dust box, and a space is formed between a side face of the filter adjacent to the filter surface and an inner face of the dust box, the filter surface facing the side face of the filter; and
   a guide unit is provided to guides air, which flows in through the inlet that is disposed at a side where an upper side of the filter surface is located, to the space, to a bottom side of the filter surface, to inside the filter, and to the outlet.

2. The dust collection device for a power tool according to claim 1, wherein the guide unit includes a partitioning wall that is provided between the inlet and the filter and that guides the air toward the space.

3. The dust collection device for a power tool according to claim 2, wherein the space is configured to be a flow-around space that extends continuously around a periphery of the filter, and the partitioning wall is provided so as to close a gap between the inlet and the filter, excluding a merging portion in which air that flows in through the inlet merges into the flow-around space, such that air that flows around the filter is prevented from flowing toward the inlet.

4. The dust collection device for a power tool according to claim 2, wherein the guide unit includes a pair of air outlets formed protruding from the inlet toward the space.

5. The dust collection device for a power tool according to claim 2, wherein the dust box is formed by a box main body and a lid body that is hinged to an opening of the box main body.

6. The dust collection device for a power tool according to claim 5, wherein the partitioning wall is formed by a first partitioning wall that is erected on a rear face of the lid body, and a second partitioning wall that is erected on an inner face of the box main body and is positioned substantially on a same plane as the first partitioning wall, with the lid body closed.

7. The dust collection device for a power tool according to claim 5, wherein the inlet and the outlet are formed in the lid body.

8. The dust collection device for a power tool according to claim 5, wherein a pair of support walls is erected on the lid body, and each of the support walls holds a side face that is adjacent to the side face on which the space is formed, and closes the adjacent side face of the filter.

9. The dust collection device for a power tool according to claim 1, wherein the guide unit includes an air outlet that is formed protruding from the inlet toward the space.

10. The dust collection device for a power tool according to claim 9, wherein the air outlet fits into the inlet to serve as a leading end section of a duct that protrudes into the dust box.

11. The dust collection device for a power tool according to claim 1, wherein the guide unit is provided closer to an inner wall face of the dust box than the filter surface.

12. The dust collection device for a power tool according to claim 1, wherein the space is provided with a wall body against which air that flows into the space is caused to collide to dissipate energy thereof.

13. The dust collection device for a power tool according to claim 1, wherein the filter is folded in a direction that is perpendicular to the side face on which the space is formed.

14. A power tool to which the dust collection device for a power tool according to claim 1 is attached.

\* \* \* \* \*